United States Patent [19]

Ishida

[11] Patent Number: 4,970,929

[45] Date of Patent: Nov. 20, 1990

[54] MUFFLER FOR PIANOS

[75] Inventor: Muneo Ishida, Hamamatsu, Japan

[73] Assignee: Kawai Gakki Seisakusho Co., Ltd., Hamamatsu, Japan

[21] Appl. No.: 491,269

[22] Filed: Mar. 9, 1990

[30] Foreign Application Priority Data

Mar. 13, 1989 [JP] Japan ................................ 1-27274[U]

[51] Int. Cl.[5] .................................................. G01C 3/26

[52] U.S. Cl. ........................................................ 84/220

[58] Field of Search .................. 84/216, 219, 220, 467

[56] References Cited

U.S. PATENT DOCUMENTS

| | | | |
|---|---|---|---|
| 2,727,420 | 12/1955 | Welsh | 84/220 |
| 3,640,171 | 2/1972 | Giglio | 84/220 |
| 4,450,747 | 5/1984 | Aoyama | 84/220 |
| 4,633,753 | 1/1987 | Takahashi | 84/220 |
| 4,704,931 | 11/1987 | Nagai et al. | 84/220 |

FOREIGN PATENT DOCUMENTS

| | | |
|---|---|---|
| 54-22294 | 8/1979 | Japan . |
| 60-241094 | 11/1985 | Japan . |
| 62-142092 | 9/1987 | Japan . |
| 62-220994 | 9/1987 | Japan . |

*Primary Examiner*—Lawrence R. Franklin

*Attorney, Agent, or Firm*—Fleit, Jacobson, Cohn, Price, Holman & Stern

[57] ABSTRACT

The present invention relates to a mechanism capable of simply making a low sound volume performance on the piano, and more particularly to a muffler for pianos, which includes a flat muffler member of a cushioning material provided slidably on a damper guide holder, and which is adapted to make a low sound volume performance on the piano by striking strings by hammers with the flat muffler member of a cushioning material advanced to a position between the hammers and strings, and a regular sound volume performance thereon by striking the strings by the hammers directly with the muffler member slidingly retreated to its normal position.

4 Claims, 1 Drawing Sheet

MUFFLER FOR PIANOS

BACKGROUND OF THE INVENTION

1. Field of the Invention

This invention relates to a muffler for pianos, which enables a low-volume performance on the piano to be made without causing a change in the lightness to the touch of a key being pressed.

1. Description of the Prior Art

In a grand piano employing a conventional sound volume reducing means, by which the number of strings struck is reduced by moving a hammer laterally with an action mechanism by a pedal stepping operation, so as to obtain a sound softening effect, the dimensions of an operating mechanism become large. A piano made in view of this inconvenience and provided with a support member, which can be moved in the string-extending direction, just above an action mechanism, and a web of felt supported at one end portion thereof on this support member so that the web is interposed between a hammer and a string at a string striking time to reduce the sound volume has been proposed by Japanese Patent Publication No. 22294/1979.

This type of piano requires a special muffler consisting of a web and a support member, in addition to a complicated action mechanism. Moreover, since the action mechanism is screened by the muffler, it becomes difficult to carry out an action mechanism regulating operation. It is desired that the soft web which requires to be moved horizontally in the lateral direction has a considerably high rigidity. However, if this rigidity is excessively high, the sound volume reducing effect lowers.

SUMMARY OF THE INVENTION

Therefore, an object of the present invention is to provide a muffler for pianos, having no excess members above a complicated action mechanism and capable of carrying out an action mechanism regulating operation without any troubles, and of obtaining a large sound volume reducing effect.

To achieve this object, the present invention provides a muffler for pianos, consisting of a slide plate provided on a damper guide holder, which is fastened to the upper surface of a front edge portion of a sound board on a piano body, in such a manner that the slide plate can be moved slidingly in the longitudinal direction, and a muffler member which is attached to a frotn end portion of the slide plate, and which is composed of a cushioning material having in a rear half portion thereof elongated slits the number of which is in agreement with that of damper mechanisms, a normal-volume performance on the piano being made when the slide plate is in a retired position, a low-volume performance on the piano being given when the slide plate is in an advanced position.

The above and other objects as well as advantageous features of the invention will become apparent from the following description of the preferred embodiment taken in conjunction with the accompanying drawings.

DESCRIPTION OF THE PREFERRED EMBODIMENT

An embodiment of the present invention will now be described with reference to the drawings.

Figure 1:
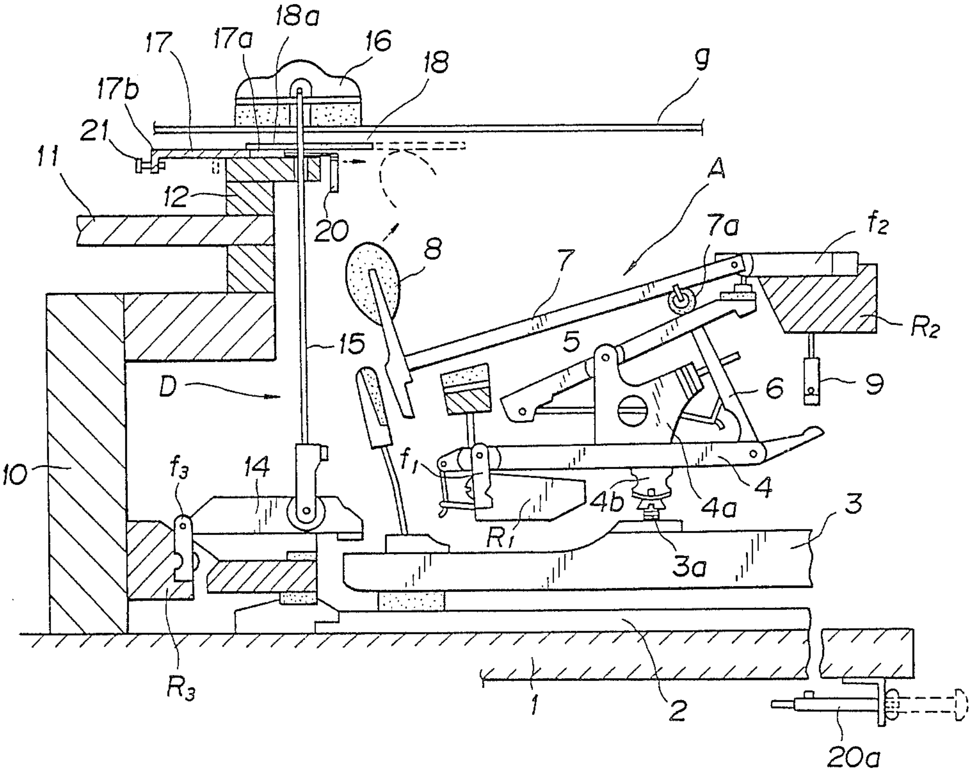
FIG. 1 is a partially sectioned side elevation of an embodiment of the present invention.

Referring to FIG. 1, a reference numeral 1 denotes a key bed in a piano body, and a square frame type keyboard guide bar 2 is provided on the key bed 1. A required number of keys 3 are set above the keyboard guide bar 2 so that the keys 3 can be turned via a central balance rail (not shown), and action mechanisms A are provided above the respective keys 3.

As generally known, an action mechanism A consists of a wippen 4 supported pivotably at the rear end portion (the right side portion of the drawing shall represents the front side portion of the embodiment, and the left side portion of the drawing the rear side portion thereof) thereof on a flange $f_1$ on a center rail $R_1$, a repetition lever 5 connected pivotably at the intermediate portion thereof to a post **4*a* on the intermediate portion of the wippen 4, an L-shaped jack 6 fixed pivotably at an angled portion thereof to the front end portion of the wippen 4, a hammer shank 7 supported pivotably at the front end portion thereof on a flange $f_2$ on a shank rail $R_2$, and a hammer 8 provided at the free end of the shank 7. When an operating portion of a key 3, which is at the front end part thereof, is pressed downward, the wippen 4 is turned upward via a capstan screw 3*a* on the key 3 and an wippen heel 4*b*. In accordance with this pivotal movement of the wippen 4, the repetition lever 5 and jack 6 are moved up together to cause the upper end of the jack 6 to push up a hammer roller 7*a*. While the repetition lever 5 and jack 6 are moved up, the front end of a lateral member of the jack 6 engages a regulating button 9, and the jack 6 is turned clockwise and disengaged at the upper end thereof from the roller 7*a*. In the meantime, the hammer shank 7 is turned quickly in the upward direction due to the upwardly pushed roller 7*a*, and the hammer 8** strikes a string g to produce a predetermined sound.

Figure 2:
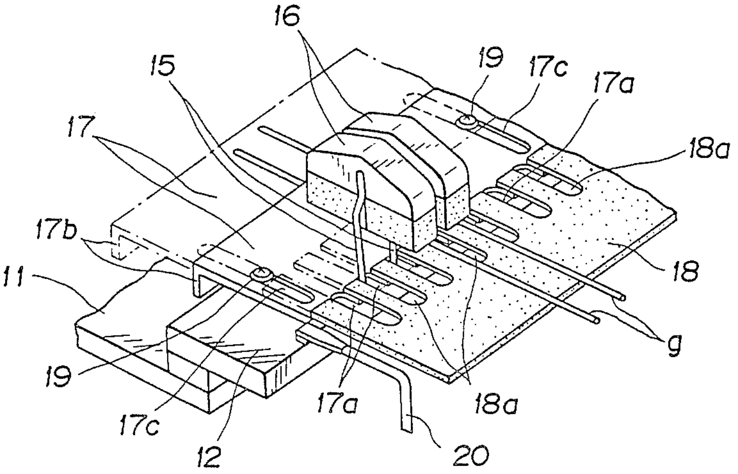
FIG. 2 is a perspective view of a principal portion of the embodiment.

A damper mechanism D is provided at the back of each action mechanism A, and consists of a damper lever 14 which is supported pivotably at the rear end portion thereof on a flange $f_3$ on a damper rail $R_3$ fixed to the front surface of the lower portion of a rear case 10 in the piano body, and which is superposed at the front end portion thereof on the rear end portion of the key 3, a damper wire 15 standing up from the front end portion of the lever 14 so as to pass through a damper guide holder 12 provided on the front end portion of a sound board 11, and further extend in the upward direction, and a damper head 16 fixed to the upper end of the wire 15 and contacting the string g from the upper side thereof. When the key is pressed, the damper 14 is turned upward. In accordance with the upward movement of the lever 14, the wire 15 is moved up to separate the damper head 16 temporarily from the string g, whereby a sound is produced by a string striking operation of the hammer 8. Immediately after the production of the sound, the damper head 16 is brought into contact with the string g to stop the unnecessary sound. According to the present invention, a damper guide holder 12 (which is divided into a plurality of parts correspondingly to the strings extending in the planes of different heights at lower and higher sound volume portions) is provided on the front end portion of the sound board 11 so as to extend in the widthwise direction of the piano body as clearly shown in FIG. 2. A slide plate 17 is provided on this damper guide holder 12. The slide plate 17 consists of a metal or a synthetic resin, and is provided at its front end portion with a required number of U-shaped slits 17*a* through which the damper wires 15 are passed, and at the rear end portion thereof with a short downwardly extending collar 17*b*. Owing to elongated bores 17*c* formed in this slide plate 17 so as to be spaced at suitable intervals in the widthwise direction thereof, and pins 19 implanted in the damper guide holder 12 and engaged with these elongated bores 17*c*, the slide plate 17 set on the upper surface of the damper guide holder 12 can be moved slidingly in the longitudinal direction thereof. A flat muffler member 18 is fixed to the upper surface of the front end portion of the slide plate 17 by using a suitable means, such as a bonding agent or an adhesive tape. The muffler member 18 consists of a cushioning material, such as felt and an unwoven cloth, and is provided at its rear half portion with elongated slits 18*a* aligned with the slits 17*a* in the slide plate 17 and generally having such a length (longitudinal size) that does not cause a string striking action of a hammer 8 to be obstructed.

An operating member 20 consisting of a flexible wire or a rod is connected to the side portion of the front end of the slide plate 17. In the illustrated embodiment, this operating member 20 is adapted to be moved slidingly by a knob 20*a* provided on the lower surface of the front end portion of the key bed 1. The operating member 20 may also be driven by a pedal stepping operation.

A reference numeral 21 denotes a stopper provided on the downwardly extending collar 17*b* formed at the rear end of the slide plate 17.

When the slide plate 17 and muffler member 18 are in a retreated position shown by solid lines in FIG. 1 (by chain lines in FIG. 2), the hammer 8 is turned by a key pressing action to make a regular string striking performance. In order to play the piano in the nighttime, the knob 20*a* is pulled out of its bracket and fixed like a bayonet cap. Consequently, the slide plate 17 and muffler member 18 on the damper guide holder 12 advance to the position shown by broken lines in FIG. 1 (by solid lines in FIG. 2), so that the muffler member 18 is interposed between the hammer 8 and string g. With the muffler member 18 set in this position, a low sound volume performance, in which the volume of a sound produced by pressing a key is reduced to a low level, is made.

If this muffler member 18 consists of a flat one-piece material, it is hard to be bent due to its rigidity, and a key being pressed is somewhat heavy to the touch. According to the present invention, the elongated slits 18*a* the number of which is in agreement with that of the damper wires 15 in the damper mechanism D are provided in the rear half portion of the muffler member 18. Therefore, when the hammer 8 collides with the muffler member 18, the latter is bent easily in the string striking direction, whereby the key being pressed is as light to the touch as the same key pressed in a regular piano playing mode.

The present invention has the above-described construction. Accordingly, when the muffler member is displaced to the advanced position, a low sound volume performance on the piano can be made easily without causing a change in the lightness to the touch of a key being pressed. The present invention is suitably used when the piano is played in a private house in the nighttime. Since no parts screening the action mechanism are provided above the same, an action mechanism regulating operation can be carried out easily. Moreover, since the muffler member is set by utilizing the damper guide holder provided on the sound board on a piano body, a special member for supporting the muffler member is not required.

The present invention is not, of course, limited to the above embodiment; it may be modified in various ways within the scope of the appended claims.

What is claimed is:

1. A muffler for pianos, comprising a slide plate provided on a damper guide holder fastened to the upper surface of a front end portion of a sound board on a piano body, in such a manner that said slide plate can be moved slidingly in the string extending direction (longitudinal direction), and a flat muffler member fixed to a front end portion of said slide plate and consisting of a cushioning material provided in a rear half portion thereof with slits through which damper wires in a damper mechanism are passed, said muffler member being set controllable so that said muffler member is moved into and out of a spatial range close to strings, in which spatial range hammers operated by piano keys make string striking actions.

2. A muffler for pianos according to claim 1, wherein elongated slits through which said damper wires are passed are formed in the portion of said muffler member which is attached to said slide plate, so as to reduce the rigidity of said muffler member.

3. A muffler for pianos according to claim 1, wherein said slide plate to which said muffler member is fixed is provided so that the longitudinal movements of said slide plate are controlled by a knob provided on the lower surface of a front end portion of a piano key bed.

4. A muffler for pianos according to claim 1, wherein said slide plate to which said muffler member is fixed is provided so that the longitudinal movements of said slide plate are controlled by a pedal stepping operation.

* * * * *